Sept. 9, 1941.  A. LYSHOLM ET AL  2,255,430
HYDRAULIC POWER TRANSMISSION
Filed Sept. 18, 1937   3 Sheets-Sheet 1
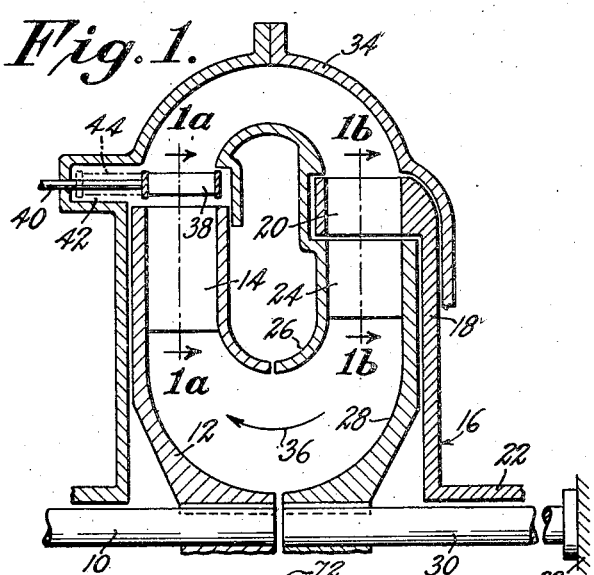
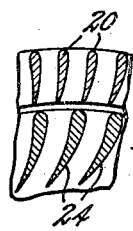
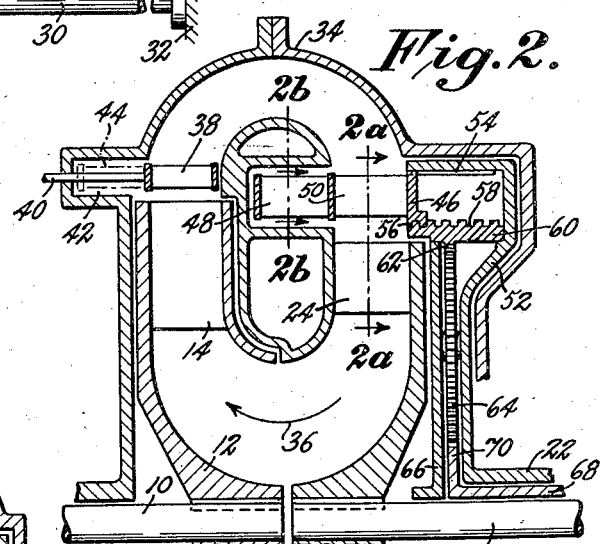
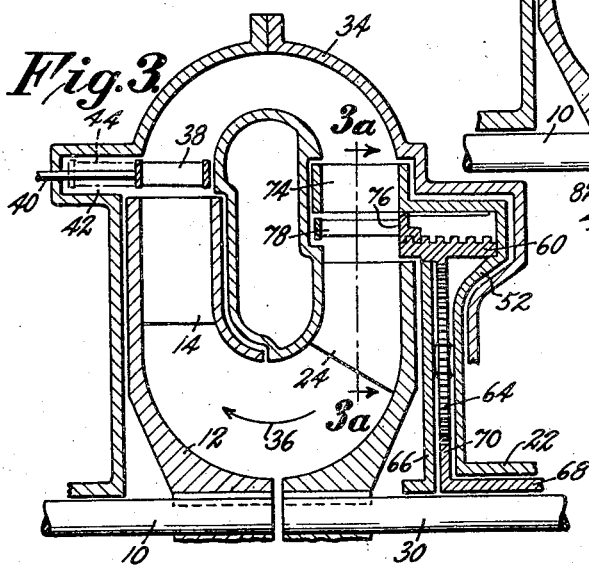
INVENTORS
ATTORNEY

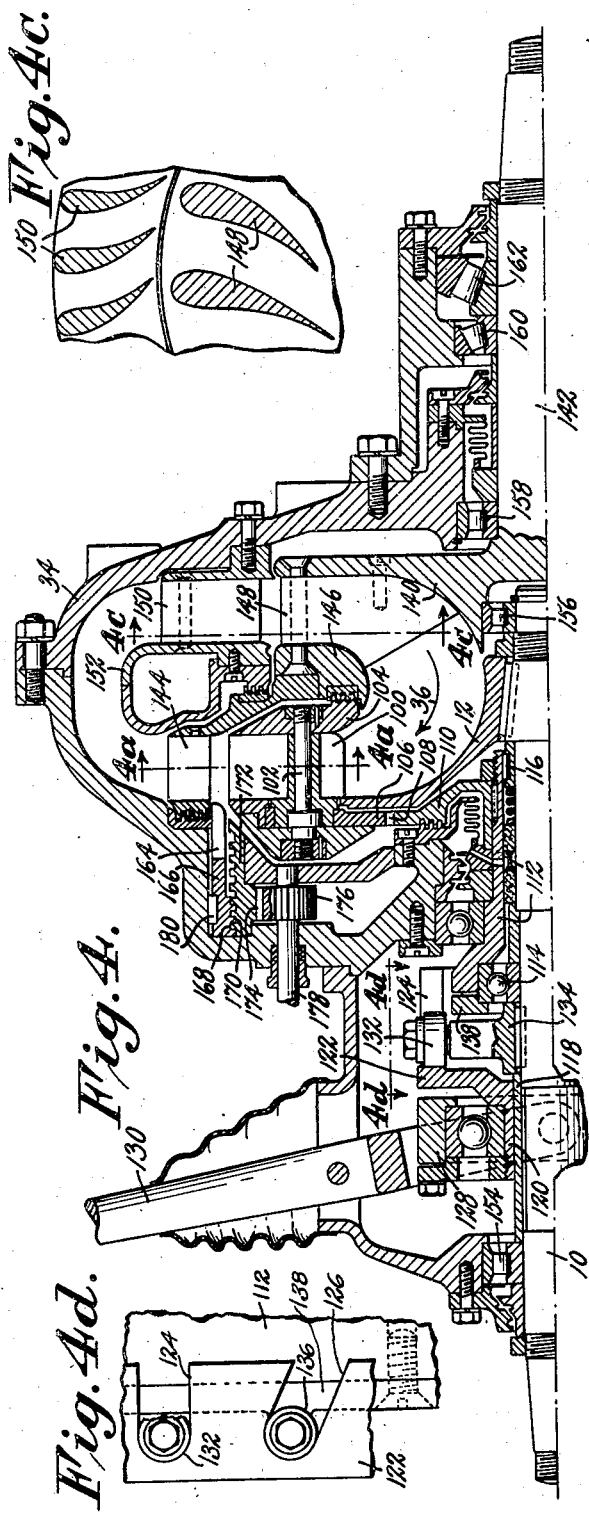

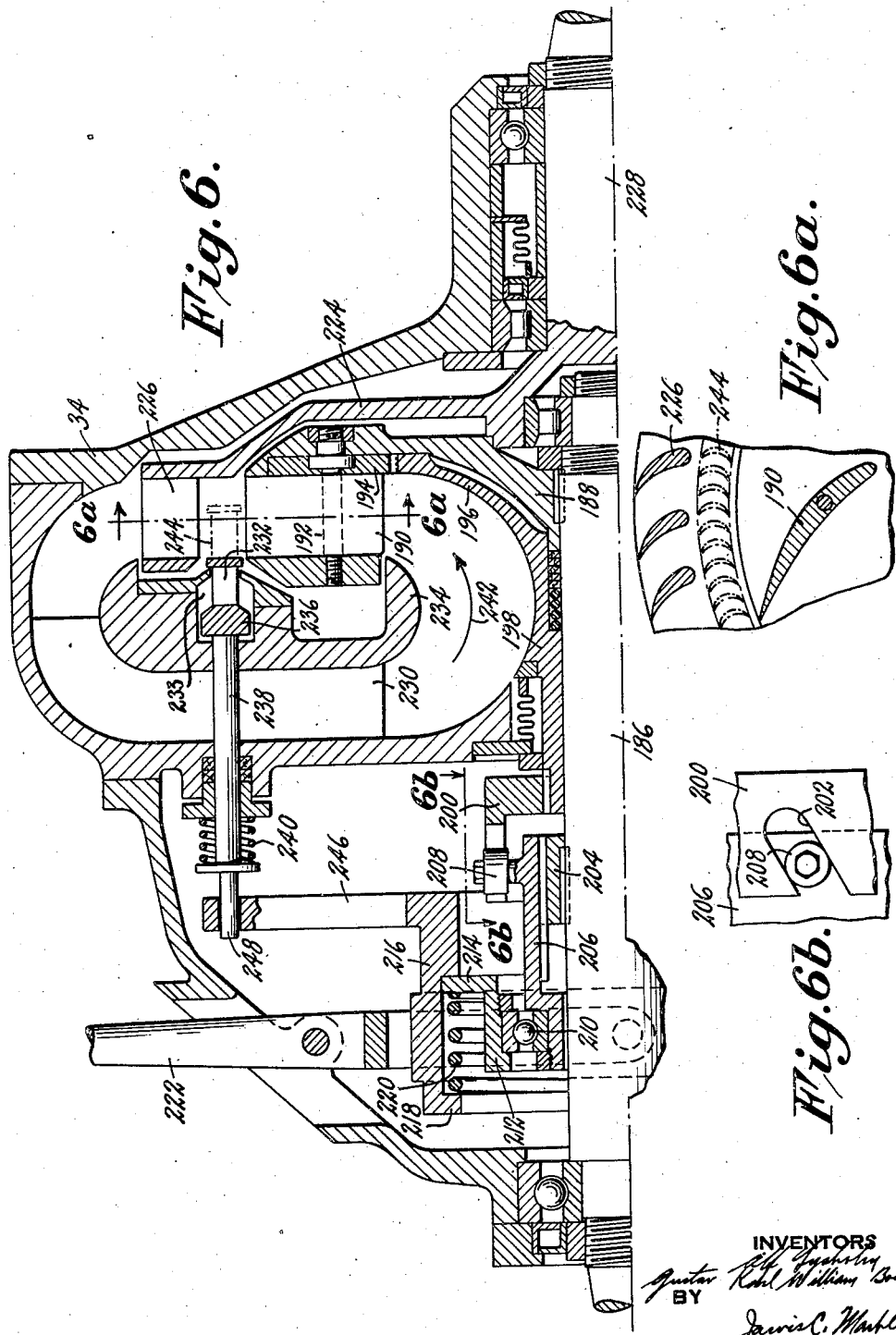

Patented Sept. 9, 1941

2,255,430

UNITED STATES PATENT OFFICE 2,255,430

HYDRAULIC POWER TRANSMISSION

Alf Lysholm, Stockholm, and Gustav Karl William Boestad, Lidingo, Sweden, assignors, by mesne assignments, to Jarvis C. Marble, Leslie M. Merrill, and Percy H. Batten, trustees Application September 18, 1937, Serial No. 164,478
In Great Britain September 21, 1936

11 Claims. (Cl. 60—54)

The present invention relates to hydraulic power transmissions and has particular reference to the kind of transmission in which the working liquid such as water, oil or the like circulates in a closed circuit provided in a working chamber, the circulation being caused by the rotation of pump blades situated in the circuit and the circulated liquid serving to transmit power to a driven or secondary member by flow through one or more stages of turbine blades attached to the driving member, suitable guide blades being employed to direct the flow of the working liquid through the turbine stages in the manner desired.

A principal object of the invention is to provide in apparatus of the above general type, means for controlling the speed of the secondary or turbine member of the apparatus and/or for reversing the direction of rotation of the same, such means being so constructed and arranged that no injurious effect upon the efficiency of operation of the apparatus will be effected thereby when the apparatus is operated with the secondary member rotating in normal forward direction.

In accordance with the invention the rows or rings of pump blades, turbine blades and guide blades are arranged in the working chamber of the apparatus in the order named with respect to the direction of flow of the working liquid, and means are provided for changing at will the direction or flow of the liquid discharged from the pump blades prior to its passage through the first row of turbine blades, which in some embodiments of the apparatus may constitute the only row of turbine blades.

The preferred arrangement of the invention contemplates the employment of, in addition to such constantly acting row or rows of guide blades as may be employed, an additional row of what may be termed auxiliary or controlling guide blades which are fixed rotationally but shiftable into or out of the constant path of flow of the working fluid, such auxiliary guide blades being shiftable into the path of the working fluid on the discharge side of the pump blades and acting to alter the direction of flow of a portion or all of the working fluid without, however, diverting it from its constant path of flow.

The auxiliary guide blades are in accordance with the invention so formed that they deflect the liquid as discharged from the pump blade system in such a way that after leaving these auxiliary guide blades, the liquid will impinge upon the back or rear side of the succeeding turbine blades instead of upon the front or forward side as is the case when the auxiliary guide blades are not inserted into the circuit. With this arrangement, if the auxiliary guide blades are inserted only partly into the circuit of flowing liquid the succeeding turbine blades will be impinged in part on the front side thereof and in part on the rear side, since the liquid flow directly from the pump blades to these turbine blades will have a direction of flow quite different from that of the liquid deflected by the guide blades. The portion of the liquid deflected by the auxiliary blades before entering the turbine blades and impinging on the rear sides thereof will act in opposition to the portion of the liquid flowing directly from the pump blades to the turbine blades and impinging upon the front sides of the latter.

If the auxiliary guide blades are inserted into the circuit to only a small extent, the force exerted on the turbine blades by the undeflected portion of the liquid will overcome the force exerted by the deflected portion and the turbine will continue to rotate in the same direction as the pump blade system. The speed of the turbine, however, will be decreased because of the braking effect produced by the deflected portion of the liquid, tending to cause reverse rotation of the turbine blades. As the length of the auxiliary guide blades projecting into the liquid circuit is increased, the increasing braking effect of the deflected portion of the liquid will reach a point where the deflected and undeflected portions of the liquid will counteract each other and the turbine member will be stopped. Further increase of the length of the auxiliary blades projected into the circuit will then cause the turbine to rotate in reverse direction.

If, because of the insertion of auxiliary guide blades, the turbine member is caused to operate in reverse direction, and if the same turbine blades are employed for reverse drive as for forward drive, the liquid leaving the turbine blades will have a direction such that the reaction pressure from the liquid discharged therefrom will be in opposition to the reversed direction of rotation of the turbine member, thus decreasing the efficiency of the hydraulic mechanism when in reverse drive.

In order to avoid this undesirable decrease in efficiency when in reverse drive, one or more turbine blade rows may be made shiftable in order to replace turbine blading used in forward drive with blading consisting of blades designed for reverse rotation of the turbine member. Alternatively, a shiftable blade ring forming an elongation or extension of the normal turbine blading may be inserted into the liquid circuit, such blade ring consisting of guide blades disposed so as substantially to reverse the direction of flow of the liquid discharged from the outlet of the turbine blading.

The present invention is of particular utility when applied to hydraulic transmissions of the kind under discussion in which the pump blades are adjustable for the purpose of increasing or decreasing the cross-sectional area available for flow of the working liquid through the pump. A typical example of this kind of transmission is disclosed in U. S. Patent No. 1,900,120 granted March 1, 1933.

In the practical operation of hydraulic transmissions with adjustable pump blades, it has proved to be difficult to close the blades sufficiently tightly to prevent circulation through the liquid circuit of some of the working liquid. It has been found that with the pump blades turned to their closed position, some 3% or 4% of the working liquid will leak from between the pump blades (assuming the pump blade system to be rotating at its normal speed of operation) and this leakage will tend to cause the turbine member to rotate at from 20% to 25% of the maximum speed of rotation of this member. Because of this it is not possible to operate such a transmission idly, that is, with the primary or pump member turning and the second member stationary, and it is also not possible to control in the manner that may be desired the power delivered by the transmission at low loads and low speeds to the apparatus driven thereby.

If, however, a portion of the leakage liquid is deflected by means of the auxiliary guide blades characteristic of the present invention so that it will impinge upon the rear sides of the turbine blades, it is possible to obtain complete and accurate control of the power delivered by the transmission down to zero load and speed. If, for example, the energy of the leakage liquid is assumed to produce a secondary or turbine speed of 20% of maximum speed, and if, due to the deflection of part of the leakage liquid by the auxiliary guide blades, 50% of this energy is neutralized, it is evident that the driven apparatus may be operated at a speed amounting only to about 10% of maximum speed. Obviously, if a larger percentage of the energy of the leakage liquid is neutralized, the secondary speed can be carried down to zero. From this it will be evident that by varying the percentage of the deflected leakage liquid the transmission may be accurately controlled through the range from full load to no load, the range between full load and the value of partial load corresponding to closed pump blades being controlled by adjustment of the pump blades and the remaining portion of the range between such partial load and no load being controlled by regulation of the means for changing the direction of flow of the leakage liquid.

Such control of the transmission may advantageously be simplified by combining the means for adjusting the pump blades with the means for adjusting the auxiliary guide blades, so that through a single actuating lever or the like the pump blades may first be closed and thereafter the auxiliary guide blades progressively inserted into the liquid circuit to effect the desired control of the leakage liquid discharged from the pump blade system.

For a better understanding of the more detailed nature of the invention and the manner in which it is advantageously applied to different forms of apparatus, reference may best be had to the ensuing description of the several suitable embodiments illustrated in the accompanying drawings, in which:

Fig. 1 shows in more or less diagrammatic form and in longitudinal central cross-section, part of a transmission embodying the invention in its simplest form;

Fig. 1a is a section taken on the line 1a—1a of Fig. 1;

Fig. 1b is a section taken on the line 1b—1b of Fig. 1;

Fig. 2 is a view similar to Fig. 1 illustrating an embodiment in which both forward and reversing turbine blades are employed;

Fig. 2a is a section taken on the line 2a—2a of Fig. 2;

Fig. 2b is a section taken on the line 2b—2b of Fig. 2;

Fig. 3 is a view similar to Fig. 1, illustrating another form of apparatus in which auxiliary turbine blades are employed which form an elongation of the turbine blades at the outlet of the turbine blade system;

Fig. 3a is a section taken on the line 3a—3a of Fig. 3;

Fig. 4 is a section similar to Fig. 1 but in more complete form, showing the invention applied to a transmission provided with adjustable pump blades;

Fig. 4a is a section taken on the line 4a—4a of Fig. 4, with the pump blades open;

Fig. 4b is a section taken on the line 4a—4a of Fig. 4, with the pump blades closed;

Fig. 4c is a section taken on the line 4c—4c of Fig. 4;

Fig. 4d is a fragmentary external view of part of the apparatus shown in Fig. 4 viewed from the line 4d—4d of Fig. 4;

Fig. 5 is a diagram illustrating the influence of the deflection of leakage liquid on the speed and power delivered by the turbine member;

Fig. 6 is a view similar to Fig. 4 showing a different application of the invention to a transmission having adjustable pump blades;

Fig. 6a is a section taken on the line 6a—6a of Fig. 6; and

Fig. 6b is a fragmentary external view of part of the apparatus shown in Fig. 6 viewed from the line 6b—6b of Fig. 6.

Referring now to Fig. 1 of the drawings, 10 designates the primary or driving shaft of the transmission, this shaft being connected to and driven from any suitable source of power. Keyed to this shaft is the pump rotor 12 carrying a row of pump blades 14 in the form of a ring. The turbine member 16 comprises a rotor part 18 carrying a row of turbine blades 20, the rotor part being in this embodiment formed integrally with the driven or secondary hollow shaft 22 of the transmission.

A row of stationary guide blades 24 is fixed between an inner stationary member 26 and a stationary carrier 28, the latter being fixedly secured to a stationary shaft 30 secured to some suitable rotationally fixed abutment, indicated diagrammatically at 32.

The above described blading is enclosed in a casing 34 to provide a suitable working chamber for circulation of the working fluid.

In the apparatus described, when the primary shaft is rotated, the working fluid is circulated in the closed path of flow in the direction indicated by the arrow 36, delivering the energy derived from the pump to the turbine blades 20 to effect rotation of shaft 22.

The auxiliary guide or reversing blades for changing the direction of flow of the liquid discharged from the pump are indicated at 38. These blades are mounted in a shiftable carrier connected to a suitable actuating rod 40 passing through the casing. By means of this rod the auxiliary blades may be inserted into the liquid circuit as indicated in the drawing or withdrawn into the chamber 42 formed in the casing, to the position shown by dotted lines 44.

For normal forward drive, the auxiliary blades 38 are in the position shown at 44 and liquid discharged from the pump blades is delivered directly to the turbine blades 20.

If blades 38 are shifted from the position shown in 44 toward the position shown in the drawing, they will progressively deflect and reverse the direction of flow of a portion of the liquid discharged from the pump blades 14 and as the blades are further shifted into the liquid circuit, a position will be reached where the forces exerted on the turbine blades by the deflected and undeflected portions of the liquid will neutralize each other and the turbine will be brought to rest. Movement of the blades 38 to the position shown in the drawing will cause deflection of the entire amount of liquid circulated and will result in reverse operation of the turbine.

In the embodiment illustrated in Fig. 2, the pump and guide structure is similar to that already described in connection with Fig. 1 and need not again be described. The present embodiment differs from the preceding one by the provision of an axially shiftable turbine ring 46 carrying two rows of blades 48 and 50; blades 48 being designed for normal forward operation of the apparatus and blades 50 being designed for reverse operation.

The blade ring 46 is prevented from rotating relative to the turbine rotor member 52 by engagement with grooves or splines 54 in the latter member, and is provided on its inner face with threads 56 adapted to engage similar threads 58 in a threaded ring member 60. Member 60 is provided with threads 62 engaging a gear wheel 64 secured to the turbine member 52 and to a disc member 66 arranged to rotate synchronously with the turbine member. Between the stationary shaft 30 and the hollow turbine shaft 22, there is located a sleeve member 68 formed at its inner end to provide a pinion 70 engaging gear 64.

It will be evident that if the hollow shaft parts 22 and 68 are rotated relatively to each other, the consequent rotation of gear 64 and ring 60 will cause the turbine ring 46 to be retracted from the position shown in the drawing to a position in which the blades 48 are in the path of flow of the working liquid. Any suitable apparatus may be employed for effecting such relative rotation between parts 22 and 68, such, for example, as apparatus of the kind described in U. S. Patent No. 1,900,120 previously mentioned for adjusting the pump blades or as hereinafter described in connection with the adjustable pump blades shown in Fig. 4, or by means of planetary gearing of the kind described for this purpose in the pending application of Alf Lysholm, U. S. Serial No. 156,113, filed July 28, 1937. Since such apparatus is not per se a part of the present invention, it need not be described in detail herein.

With the parts in the positions shown in Fig. 2 the transmission is set to operate in reverse. The liquid discharged from the pump blades is deflected by the auxiliary guide blades 38 and acts upon the rear sides of turbine blades 50, the disposition of which blades is indicated in Fig. 2a. As will be noted from this latter figure, blades 50 are disposed so that the discharge therefrom, with the turbine rotor moving in reverse direction as indicated by the arrow 72, passes through the succeeding stationary guide blades 24 without producing a reactive force tending to counteract the rotation of the turbine in reverse direction.

For forward drive the auxiliary guide blades 38 are withdrawn from the liquid circuit and by relative rotation of shaft 66 with respect to shaft 62 the turbine ring 46 is shifted to the right from the position shown in Fig. 2 so as to bring the turbine blades 48 into the liquid circuit.

As is evident from Fig. 2b, blades 48, which turn in the opposite direction from blades 50, are oppositely disposed as compared with blades 50 so as to properly receive the liquid discharged directly from the pump blades, and to deliver the liquid to the guide blades 24 in the proper direction.

In the embodiment illustrated in Fig. 3, auxiliary shiftable turbine blades are employed to deflect the discharge from the main turbine blades which are permanently in the liquid circuit.

In this embodiment of the invention, the arrangement of pump blades, auxiliary guide blades and permanent fixed guide blades are as previously described. In this instance, however, the turbine member 52 rigidly carries a row of main turbine blades 74 which are permanently located in the liquid circuit. An axially shiftable blade ring 76, which is prevented from rotating relative to member 52 by means of the splines 54, carries a row of auxiliary turbine blades 78. Ring 76 is shiftable out of the path of flow of the liquid by apparatus similar to that already described in connection with Fig. 2 for shifting ring 46 of that embodiment.

With the parts in the position shown in Fig. 3 the apparatus is set for reverse drive. The direction of flow of the liquid discharged from the pump blades is reversed by the auxiliary guide blades 38 so that this liquid enters the blade row 74 in the direction indicated by the arrow 80 in Fig. 3a, impinging in the rear sides of the blades and causing rotation of the turbine in the direction of the arrow 82. The liquid leaves the blades 74 in the direction of the arrow 84 and the auxiliary turbine blades reverse its direction so that the liquid enters the fixed guide blades 24 in the direction of the arrow 86. From this it will be evident that the reaction of the discharge of the liquid leaving the turbine blade system is in a direction tending to turn the turbine in the reverse direction indicated by the arrow 82.

For forward drive the auxiliary guide blades 38 and the auxiliary turbine blades 78 are withdrawn from the liquid circuit. Without the reversing action of blades 38, the liquid enters the blade rows 74 in the direction of the arrow 88, impinging on the forward sides of the blades and tending to turn the turbine in the direction of arrow 90. With the turbine turning in the direction of arrow 90, it is obviously not necessary to reverse the direction of flow of the liquid after leaving blades 74, since the reactive effect of the liquid on these blades as it leaves them is in a direction tending to turn the turbine in the proper direction.

The several different forms of apparatus shown in Figs. 1 to 3 produce somewhat different efficiency and torque results and the most advantageous form to use in any specific case will be indicated by the service for which the transmission is intended.

The form shown in Fig. 1 may be expected to give approximately 70% of the torque in reverse that is delivered when the apparatus is operating in forward direction (assuming equal input), and is most suitable for driving apparatus that is not required to operate in reverse direction for a large proportion of the total operating time. The reason for this will be more or less evident since if the turbine blades 20 are designed for high efficiency in forward operation, they obviously are not suited for efficient operation in reverse direction with the liquid impinging on the rear sides of the blades. If a large percentage of operating time is expected to be in reverse, and high efficiency in reverse is to be obtained, the position of the turbine blades is advantageously made more or less a compromise which will reduce the efficiency in forward drive somewhat from the maximum obtainable, but which will operate to increase the efficiency in reverse drive as compared with the efficiency obtainable in reverse if the blades are positioned with only forward drive in mind.

In the form of apparatus shown in Fig. 2, relatively high efficiency in both forward and reverse may be obtained as compared with the arrangement shown in Fig. 1, but as compared with Fig. 1, the structure is more complex and will probably not be warranted except for applications where reverse drive takes place during a substantial portion of the total running time. The same is true of the modification shown in Fig. 3.

Turning now to Fig. 4, the transmission illustrated is of the adjustable pump blade type.

In this form the primary shaft is indicated at 10, to which is keyed the pump rotor 12. The pump blades 100 are pivotally mounted on pins 102 which connect the rotor disc and the inner pump disc 104. Blades 100 are rigidly connected to and turn with discs 106 having tooth segments 108 meshing with a common gear 110 keyed to the inner end of a sleeve 112 mounted on bearings 114 and 116. A sleeve 118 around the drive shaft 10 provides a bearing surface for an axially slidable member 120 provided with a disc-like portion 122, from which projects a cylindrical part having a series of slots 124 and 126 formed therein (see Fig. 4d). On the member 120 is mounted a ball bearing carried by a ring 128 which ring is axially shiftable by means of a forked actuating lever 130. As will be seen from Fig. 4d the slots 124 are parallel to the axis of shaft 10. These slots are engaged by roller pins 132 on a member 134 keyed to shaft 10. Slots 126 are oblique and in these slots are located roller pins 136. Pins 136 are carried by ring 138 rigidly fixed to sleeve 112.

From the above described construction, it will be evident that if lever 130 is moved so as to shift the member 120 to the left from the position shown in the figure, sleeve 112 will be moved rotationally with respect to shaft 10 and rotor 12, so that the adjustable pump blades will be moved toward the closed position shown in Fig. 4b from the open position shown in Figs. 4 and 4a. Other specific mechanism may be employed within the scope of the present invention for effecting the relative rotation of the parts required to effect adjustment of the position of the pump blades.

In the present embodiment of apparatus the turbine system comprises a turbine rotor 140 integrally formed with the driven or secondary shaft 142. This rotor carries two rows or stages of turbine blades. The first stage, consisting of blades 144, is carried by the rotating central core member 146 between which and member 140 are fixed the second stage turbine blades 148, these latter blades acting as bridging members for carrying member 146.

A ring of fixed guide blades 150 is supported between the casing 34 and the stationary central member 152.

The driving or primary shaft 10 is mounted in bearings 154, 114 and 156, the latter bearing forming a pilot bearing for the inner end of the driven or secondary shaft 142. The latter shaft is mounted in bearings 158, 160 and 162, the two latter bearings serving to absorb the axial thrust of the turbine shaft.

The auxiliary guide blades are indicated at 164 and as shown in Fig. 4 are withdrawn from the path of liquid flow. The blade ring or carrier 166 for these blades is internally threaded as at 168 to mesh with threads 170 on ring member 172, which is provided with internal teeth 174 meshing with pinion 176 mounted on an operating shaft 178 passing through the casing of the transmission. Carrier 166 is prevented from rotating in the casing by means of a key 180, operating in a suitable keyway in the casing.

It will be evident from the drawing that the blade carrier 166 can be moved to the right from the position shown in the drawing and the auxiliary guide blades 164 projected into the liquid circuit to the extent desired, by rotating the gear 176.

By referring to Figs. 4a and 4b, it will be evident that through the manipulation of the control lever 130, the pump blades may be moved from the open position shown in Fig. 4a to the fully closed position shown in Fig. 4b. In the latter position, there will be some leakage between the blades as previously mentioned.

When the pump blades are in the open position shown in Fig. 4a, the arrows 180 indicate the direction of the absolute inlet velocity of the working liquid entering the ring of turbine blades 144, the direction of rotation of the pump blades being as indicated by the arrow 182.

In order to control the turbine in spite of the leakage liquid passing the pump blades when they are in the closed position shown in Fig. 4b, the auxiliary guide blades 164 are projected into the liquid circuit as indicated in the latter figure, and these blades operate to deflect the portion of the working liquid impinging thereon so that it enters the ring of blades 144 in the direction indicated by the arrows 184.

In the embodiment shown, the auxiliary guide blades 164 are shorter in axial length than the pump blades, so that when blades 164 are fully projected into the liquid circuit, they will not act to deflect all of the liquid discharged from the pump blades. The length of blades 164 is advantageously made such that when fully projected into the liquid circuit, they will deflect just enough of the liquid to neutralize the turning effect of the leakage liquid and bring the turbine member to rest.

The diagram of Fig. 5 illustrates the nature of the control that may be effected with the above described apparatus. In this diagram the abscissae represent speed of rotation of the turbine or secondary member and the ordinates represent the power transmitted. With the transmission not provided with auxiliary guide blading the power, represented by curve P, can be controlled by means of the adjustable pump blades only through the range from full load (100% secondary speed) to a certain value of partial load, the latter being indicated on the curve P by $a$. In the range between $a$ and 0 the power transmitted will be a constant, as indicated by the line $b$. The value of $b$ will depend upon the amount of leakage liquid passing the pump blades.

By the employment of the present invention, however, the transmission can be accurately controlled within the low load range $a$—0, represented by the line $c$. The area between lines $b$ and $c$ represents power that is braked or neutralized by means of the portion of the liquid stream deflected by the auxiliary guide blades. On the diagram the point $a$ corresponds to fully closed pump blades and point 0 corresponds to closed pump blades and fully projected auxiliary guide blades.

This form of apparatus is particularly desirable for fan drives, especially where it is desired to employ a constant speed source of power such as an induction motor for driving the primary shaft and where it is also desired to have complete and accurate control of fan speed down to zero. With an arrangement such as this, a constant speed prime mover may be employed directly connected to the transmission without the interposition of a clutch or releasable coupling to effect stoppage of the driven apparatus.

Fig. 6 illustrates another form of apparatus in which the control of the adjustable pump blades and of the auxiliary guide blades is effected through a single control means.

In this embodiment the primary or drive shaft 186 has keyed thereto a pump rotor 188 carrying a ring of adjustable pump blades 190 turning about pins 192 mounted in the rotor. Discs 194 secured to the pump blades and rotating therewith are provided with teeth meshing with the gear wheel 196 formed as a part of sleeve member 198 rotatably mounted on shaft 186. A ring member 200 is keyed to sleeve 198 and as indicated more clearly in Fig. 6b, this member is provided with one or more oblique slots 202. A ring 204 keyed to shaft 186 is in splined engagement with an axially shiftable member 206 carrying roller pins 208 projecting into the slots 202. One end of member 206 is connected by means of bearing 210 to a ring member 212 flanged at one end as at 214. Flange 214 projects into a recess in a shift ring 216 provided with a retaining flange 218 between which and flange 214 there is located spring 220. Shift ring 216 is adapted to be shifted axially by means of a forked control lever indicated at 222.

The turbine member 224 carries a row of turbine blades 226 and is formed as an integral part of the driven or secondary shaft member 228.

The fixed or permanent guide blades are indicated at 230.

The auxiliary guide blades are indicated at 232 and in the position shown in the drawing in full lines are retracted into a recess 233 formed in the stationary central member 234 supported from the outer casing through the medium of the stationary guide blades 230. Blades 232 are mounted on a carrier ring 236 connected to rods 238 passing through the casing and urged toward the position shown in the drawing by means of the spring 240.

As will be evident from Fig. 6, the direction of circulation of the working liquid is as indicated by arrow 242 and movement of the blades 232 to the right to the dotted line position indicated at 244 will cause deflection of a portion of the liquid discharged from the pump blades 190.

Shift ring 216 is provided with arms 246 through the outer ends of which pins 248 forming extensions of rods 238 project.

In the position of the parts shown in Fig. 6, the pump blades are open and in order to close them the shift ring 216 is moved to the right from the position shown. The initial movement to the right from the position shown acts to turn the sleeve 198 relative to the pump rotor 188 and move the adjustable pump blades toward closed position, without shifting rods 238 and the auxiliary blades 232 from the position shown in the figure. Movement of the pump blades without movement of the auxiliary blades is made possible because of the lost motion connection between arm 246 and the retainer for the spring 240. Further movement of the pump blades is continued until they are closed without movement of the adjustable guide blades from the position shown in the drawings, the amount of lost motion in the connection being such that this may be effected. Movement of the control apparatus through this range corresponds to the portion of the curve P of Fig. 5 lying above point $a$. After the control apparatus has been moved until the pump blades are in closed position, as shown in Fig. 4b, continued movement of the shift sleeve 216 and arm 246 to the right compresses spring 240 and causes the auxiliary guide blades to be progressively projected into the liquid circuit. This effects the control desired along the line $c$ of Fig. 5. Movement of the control apparatus in the latter range (after the pump blades are fully closed), is permitted because of the resilient connection afforded by spring 220 between the shift sleeve 216 and member 206. Owing to this spring connection, the former can move to the right after the latter has reached the right-hand limit of its movement.

In this connection it is to be noted that it is intended to bring the auxiliary reversing guide blades into effective action only after the adjustable pump blades have been fully closed or substantially fully closed. Consequently, the auxiliary guide blades are required to effect reversal of a very greatly reduced flow of fluid as compared with the normal rate of flow when the pump blades are open, in fact, only a few per cent of the normal flow. For this reason the number of blades in the auxiliary guide blade row must be greatly in excess of the number of blades in the row of turbine blades to which the auxiliary guide blades discharge in order to provide sufficiently narrow passages between the guide blades to effectively guide and reverse the direction of flow of the relatively very small quantity of fluid flow from the pump due to leakage when the pump blades are closed and the action of the auxiliary guide blades is required.

From the foregoing it will be evident that from a single control member, complete control of the speed and power of the secondary member of the transmission can be obtained.

As in the embodiment shown in Fig. 4, the fully projected position of the auxiliary guide blades, as indicated at 244, is such that only a part of the total amount of liquid delivered from the pump blades is deflected by the auxiliary guide blades.

It will be evident that if desired, the separate forward and reverse turbine arrangement characteristic of Fig. 2 or the auxiliary shiftable turbine blade construction characteristic of Fig. 3 may be combined with the adjustable pump blade constructions shown in Figs. 4 and 6.

It is to be noted that in the forms of construction shown more or less diagrammatically in Figs. 1 and 3 and shown in Fig. 6 are essentially adapted for transmission of low torque, that is, for transmissions where a high ratio of torque multiplication is not required. The form shown in Fig. 4, which employs multiple stage turbine blading, is adapted for relatively higher torque multiplication.

In all of the above described embodiments the transmission is of the form having a stationary outer casing within which pump and turbine rotors are located. It is to be noted, however, that the invention is not restricted to this specific form of construction but may be applied to forms where either the rotating pump blades or the rotating turbine blades may be formed as part of or carried by a rotating casing member.

It is to be noted that in accordance with all forms of the present invention, the shiftable members provided for the purpose of altering the operating characteristics of the apparatus are constructed and arranged in such manner that when projected into the liquid circuit they do not divert the liquid from its single normal path of flow, and that when in inoperative position these shiftable parts are withdrawn from the liquid circuit in such manner as to leave a free and unobstructed path of flow for circulation of the liquid, in so far as these parts are concerned. This arrangement thus contributes materially to the obtaining of the desired control of the apparatus without appreciable impairment of the efficiency thereof when it is operating at normal load in forward direction.

Many changes and variations in the specific construction of apparatus for carrying the invention into effect will occur to those skilled in the art and it is to be understood that the scope of the invention is not limited to the embodiments hereinbefore illustrated and described by way of example, but is to be considered as embracing all forms of apparatus falling within the scope of the appended claims.

What is claimed:

1. In a hydraulic power transmission, means providing a fixed closed path of flow or circuit for working liquid, pump blades rotatably mounted in said circuit for circulating the liquid, rotatably mounted turbine blades in the circuit for absorbing power from the liquid, guide blades permanently located in the circuit for guiding the liquid, and auxiliary guide blades shiftable at will from a position outside said circuit into the circuit to alter the direction of flow of the liquid discharged from the pump blades to a direction suitable for reverse rotation of the turbine blades, said turbine blades including separate sets of blades for forward and reverse rotation of the turbine part of the apparatus and said separate sets being shiftable at will in alternation into said circuit.

2. In a hydraulic power transmission, a non-rotating casing providing a chamber for working liquid, a pump wheel carrying pump blades in said chamber for circulating liquid therein in a fixed closed path of flow or circuit, a turbine member carrying turbine blades in said chamber to be driven by the circulated liquid, guide blades carried by said casing and permanently situated in said circuit and auxiliary guide blades shiftable into and out of said circuit to deflect liquid discharged from said pump blades to a direction suitable for reverse rotation of the turbine member prior to its impingement upon any of said turbine blades, said turbine blades including separate sets of blades for forward and reverse rotation of the turbine part of the apparatus and said separate sets being shiftable at will in alternation into said circuits.

3. In a hydraulic power transmission, the combination with pump blades for circulating liquid in a closed path of flow or circuit, turbine blades permanently disposed in said circuit and adjustable means for deflecting the flow of liquid to reverse the direction of rotation of the turbine blades, of auxiliary turbine blades shiftable into said circuit to deflect the liquid as discharged from the turbine blades when the latter rotate in reverse direction.

4. In a hydraulic power transmission, the combination with pump blades for circulating liquid in a closed path of flow or circuit, turbine blades permanently located in said circuit, guide blades permanently located in said circuit to receive the liquid discharged from the turbine blades and adjustable means for deflecting the flow of liquid to the turbine blades to reverse their direction of rotation, of auxiliary turbine blades shiftable into said circuit between the discharge side of the permanently located turbine blades and the inlet side of the permanently located guide blades, said auxiliary turbine blades being formed to deflect the liquid as discharged from the turbine blades when the latter rotate in reverse direction.

5. In a hydraulic power transmission, means providing a fixed closed path of flow or circuit for working liquid, pump blades rotatably mounted in said circuit for circulating the liquid, rotatably mounted turbine blades in the circuit for absorbing power from the liquid, guide blades permanently located in the circuit for guiding the liquid, and auxiliary guide blades shiftable at will from a position outside said circuit into the circuit to alter the direction of flow of the liquid discharged from the pump blades to a direction suitable for reverse rotation of the turbine blades, said turbine blades including a row of blades for forward rotation of the turbine part and a row of blades for reverse rotation of the turbine part, the last mentioned row being shiftable at will from a position outside the liquid circuit to a position in the circuit.

6. In a hydraulic power transmission, of the kind in which working liquid is circulated in a closed path of flow or circuit, the combination with a row of pump blades adjustable to reduce the area for flow of liquid through the row and a row of turbine blades disposed to receive the liquid discharged from the pump blades, of a row of shiftable guide blades movable into and out of the liquid circuit on the discharge side of the pump blades, said guide blades being formed to deflect the liquid passing therethrough to a direction causing it to exert a force on the turbine blades opposing the force exerted thereon by undeflected liquid flowing directly from the pump blades to the turbine blades, and the effective length of said guide blades when fully inserted into the liquid circuit being less than the length of the pump blades to thereby at all times permit a portion of the liquid to flow directly from the pump blades to the turbine blades without being deflected by the guide blades.

7. In a hydraulic power transmission of the kind in which working liquid is circulated in a closed path of flow or circuit, a row of adjustable pump blades, means for moving said blades to closed position to substantially stop circulation of the working fluid, turbine blades adapted to be turned in one direction by the working fluid as discharged from the pump blades, auxiliary guide blades shiftable from a position outside the liquid circuit to a position in said circuit, and means for shifting said auxiliary guide blades into said circuit, said auxiliary guide blades being formed to deflect a portion only of the working liquid to a direction tending to turn the turbine blades the direction opposite to said one direction.

8. In a hydraulic power transmission of the kind in which working liquid is circulated in a closed path of flow or circuit, a row of adjustable pump blades, means for moving said blades to closed position to substantially stop circulation of the working fluid, turbine blades adapted to be turned in one direction by the working fluid as discharged from the pump blades, auxiliary guide blades shiftable from a position outside the liquid circuit to a position in said circuit, means for shifting said auxiliary guide blades into said circuit, said auxiliary guide blades being formed to deflect a portion only of the working liquid to a direction tending to turn the turbine blades the direction opposite to said one direction, and common actuating means operatively connecting the two first mentioned means arranged to progressively close the adjustable pump blades with the auxiliary guide blades outside the circuit and thereafter progressively project the auxiliary guide blades into the circuit to deflect a portion of the leakage liquid passing the closed pump blades.

9. In a hydraulic power transmission of the kind in which working fluid is circulated in a closed path of flow or circuit, a row of pump blades for circulating the working liquid in said circuit, a turbine member having a row of turbine blades located in said circuit to receive the working liquid discharged from said pump blades, said turbine blades being obliquely disposed to deflect the working fluid to produce torque on said turbine member primarily in the same direction of rotation as that of the pump blades and the blades in said row of turbine blades further having their inlet and outlet edges on different radii respectively, a row of stationary guide blades located in said circuit in advance of the inlet to said pump blades through which the working fluid flows after leaving the turbine blades and before entering the pump blades, and a row of auxiliary guide blades arranged to be shifted into and out of said circuit between the pump blades and the turbine blades for altering the direction of flow of at least a part of the working fluid leaving the pump blades to a direction such that it impinges on the reverse side of said turbine blades to produce a counter-acting torque on said turbine member.

10. In a hydraulic power transmission of the kind in which working liquid is circulated in a closed path of flow or circuit, the combination with a row of pump blades adjustable to reduce the area for flow of liquid through the row and a row of turbine blades disposed to receive the required discharge from the pump blades, of a row of shiftable guide blades movable into and out of the liquid circuit on the discharge side of the pump blades, said guide blades being moved into said circuit when said adjustable pump blades are closed and being formed to deflect leakage liquid passing the pump blades to a direction causing it to exert a force on the turbine blades opposing the force exerted thereon by undeflected leakage liquid flowing directly from the pump blades to the turbine blades, and the number of said guide blades in the row thereof being greatly in excess of the number of blades in the row of turbine blades to which said guide blades discharge.

11. In a hydraulic power transmission of the kind in which working liquid is circulated in a closed path of flow or circuit, the combination with a row of pump blades adjustable to reduce the area for flow of liquid through the row and a row of turbine blades disposed to receive the required discharge from the pump blades, of a row of shiftable guide blades movable into and out of the liquid circuit on the discharge side of the pump blades, said guide blades being moved into said circuit when said adjustable pump blades are closed and being formed to deflect leakage liquid passing the pump blades to a direction causing it to exert a force on the turbine blades opposing the force exerted thereon by undeflected leakage liquid flowing directly from the pump blades to the turbine blades, and the number of said guide blades in the row thereof being greatly in excess of the number of blades in the row of turbine blades to which said guide blades discharge, and a common control mechanism for progressively closing said pump blades while said guide blades are out of said circuit and thereafter progressively moving said guide blades into said circuit while the pump blades remain closed.

ALF LYSHOLM.
GUSTAV KARL WILLIAM BOESTAD.